United States Patent [19]

Toda et al.

[11] 4,021,484

[45] May 3, 1977

[54] NOVEL CATIONIC AMINO RESINS AND PROCESSES FOR PRODUCING THE SAME

[75] Inventors: Hiromi Toda, Daito; Kametaro Kunimori, Neyagawa; Kuniaki Tsumori, Osaka, all of Japan

[73] Assignee: Arakawa Rinsan Kagaku Kogyo Kabushiki Kaisha, Osaka, Japan

[22] Filed: July 10, 1974

[21] Appl. No.: 487,181

[52] U.S. Cl. .................... 260/567.6 P; 260/552 H; 260/554; 260/468 G; 260/475 FR; 260/501.15; 260/567.5; 260/309; 260/464; 260/583 P; 260/570.5 P; 260/571; 260/584 R; 526/23; 526/25; 526/44; 526/47; 526/46; 526/30; 526/55; 162/168 N

[51] Int. Cl.² ............................................ C07C 87/30

[58] Field of Search ....... 260/562.6 P, 83.3, 583 R; 526/23, 25, 44, 47, 30, 55, 46

[56] References Cited

UNITED STATES PATENTS

| | | | |
|---|---|---|---|
| 2,456,428 | 12/1948 | Parker | 260/83.3 |
| 2,510,090 | 6/1950 | DiMasi | 260/83.3 |
| 2,585,583 | 2/1952 | Pinkney | 260/83.3 |
| 2,697,079 | 12/1954 | D'Alelio | 260/83.3 |
| 2,697,080 | 12/1954 | D'Alelio | 260/83.3 |

FOREIGN PATENTS OR APPLICATIONS 1,519,689  1/1967  France ............................ 260/83.3

OTHER PUBLICATIONS

Yamoguchi et al., Chem. Abst., vol. 80, p. 3 No. 71156t, (1974).
Konovalor, Chem. Abst., vol. 72, No. 21113r.

*Primary Examiner*—James O. Thomas, Jr.
*Assistant Examiner*—James H. Reamer
*Attorney, Agent, or Firm*—Bierman & Bierman

[57] ABSTRACT

Novel cationic amino resins having a weight average molecular weight of at least 400 and an amine value of 20 to 700 and processes for producing the same characterized (a) by subjecting to thermal polymerization an alicyclic conjugated polyene compound having an alicyclic ring of 5 to 7 carbon atoms and an ethylenically unsaturated amino compound at 170 to 300° C; (b) by subjecting to thermal polymerization an alicyclic conjugated polyene compound having an alicyclic ring of 5 to 7 carbon atoms and an $\alpha,\beta$-ethylenically unsaturated nitrile at 170 to 300° C to prepare a copolymer containing a nitrile group and hydrogenating the copolymer to reduce the nitrile group.

11 Claims, No Drawings

NOVEL CATIONIC AMINO RESINS AND PROCESSES FOR PRODUCING THE SAME

The present invention relates to novel and useful cationic amino resins and processes for producing the same, more particularly to novel cationic amino resins useful as paper making sizing agents and processes for producing the same.

The present inventors have already provided a process for producing a cationic amino resin by hydrogenating a reaction product prepared from cyclopentadiene, unsaturated nitrile and chain conjugated diene in a molar ratio of 2:1:1 (U.S. Pat. Appln. Ser. No. 296,780 and DT-OS 2249808).

Subsequently, the inventors have made various researches in attempt to use the cationic amino resin as a paper making sizing agent and found that the cationic amino resin, when applied to paper, imparts hardly any sizing effect and is therefore almost ineffective to use. Accordingly it is desired to synthesize cationic amino resins which are excellent as sizing agents for making paper.

An object of this invention is to provide cationic amino resins capable of exhibiting a high sizing effect and processes for producing the same.

Another object of this invention is to provide cationic amino resins which are useful not only as paper making sizing agents but also as paper strengthening agents, retention aids, water repellent agents for fiber boards, electroconductive agents, substitutes for alum used as a fixing agent, etc. and processes for producing the same.

This invention provides a process for producing a cationic amino resin characterized by subjecting to thermal polymerization an alicyclic conjugated polyene compound having an alicyclic ring of 5 to 7 carbon atoms and an ethylenically unsaturated amino compound at 170 to 300° C to obtain a cationic amino resin having a weight average molecular weight of at least 400 and an amine value of 20 to 700. This invention further provides a process for producing a cationic amino resin characterized by subjecting to thermal polymerization an alicyclic conjugated polyene compound having an alicyclic ring of 5 to 7 carbon atoms and an α,β-ethylenically unsaturated nitrile at 170 to 300° C to prepare a copolymer containing a nitrile group and hydrogenating the copolymer to reduce the nitrile group to obtain a cationic amino resin having a weight average molecular weight of at least 400 and an amine value of 20 to 700.

The researches of the inventors have revealed that the cationic amino resins prepared by the above processes and having the specified weight average molecular weight and amine value have an excellent sizing effect and are very useful as paper strengthening agents, retention aids, water repellent agents for fiber boards, electroconductive agents and substitutes for alum used as a fixing agent. The reason why the resin obtained in accordance with this invention has such an excellent ability has not been fully clarified yet, but it is presumably attributable to the fact that the cationic amino resin produced without using a chain conjugated diene but by reacting an alicyclic conjugated polyene compound with an amine or by reacting an alicyclic conjugated polyene compound with a nitrile and hydrogenating the reaction product is a mixture of bulky polymers having various structures and molecular weights.

In the process for producing the cationic amino resin according to this invention, a reactive double bond activated with an endomethylene group is formed, and polymerization by virtue of the double bond gives a mixture of bulky polymers having various structures and molecular weights. These bulky polymers are thought to have an excellent hydrophobic property which assures an outstanding sizing effect.

In contrast, use of a chain conjugated diene produces a stable double bond at the end of the polymer, making it difficult to increase the molecular weight of the polymer. If it is attempted to increase the molecular weight, a linear polymer will be formed instead of a bulky polymer. Thus is it impossible to obtain a compound having a sizing effect.

As described above, the cationic amino resin according to this invention is composed of polymers having various structures and properties. However, as far as the resin has the molecular weight and amine value as specified in this invention, it is useful as a paper making sizing agent and effectively usable for the applications described.

The cationic amino resins of this invention can be produced by either of the following processes (I) and (II).

(I) Thermal polymerization of alicyclic conjugated polyene compound and ethylenically unsaturated amino compound.

Usuable as the alicyclic conjugated polyene compound are alicyclic polyene monomers having an alicyclic ring of 5 to 7 carbon atoms with conjugated polyene bonds. Also usable are compounds capable of forming such polyene monomers under polymerization conditions. The alicyclic ring may have 1 to 3 alkyl groups of 1 to 4 carbon atoms as substituents. Preferable examples of such compound include cyclopentadiene, cyclohexadiene, cycloheptadiene, cycloheptatriene, methylcyclopentadiene and like polyene monomers, and oligomers such as dicyclopentadiene, tricyclopentadiene, and the like which are capable of forming the corresponding polyene monomers under polymerization conditions. Among these compounds, especially preferable are cyclopentadiene and dicyclopentadiene. The alicyclic conjugated polyene compounds can be used alone or in admixture with one another.

Examples of the ethylenically unsaturated amino compound are various amino compounds having an ethylenically unsaturated bond, typical of which are the following various compounds.

(1) Allyl amine, methallyl amine and derivatives thereof represented by the formula

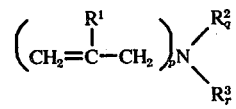

wherein $R^1$ is hydrogen atoms of methyl group, $R^2$ and $R^3$ are each hydrogen atom, lower alkyl group, 2-hydroxyethyl, phenyl, benzyl or phenoxyethyl group, $p$ is 1, 2 or 3, $q$ is 0 or 1, $r$ is 0 or 1 and $p + q + r = 3$, and quaternary ammonium salts thereof. Preferable examples of such compounds are allyl amine, methallyl amine, methyl allyl amine, dimethyl allyl amine, trimethyl allyl ammonium chloride, 2-hydroxyethyl allyl amine, diallyl amine, dimethallyl amine, methyl diallyl amime, dimethyl diallyl ammonium chloride, 2-hydroxyethyl diallyl amine, benzyl diallyl amine, etc.

2. Aminoalkyl esters of acrylic acid or of methylacrylic acid represented by the formula

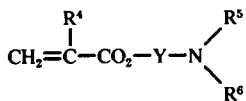

wherein $R^4$, $R^5$ and $R^6$ are each hydrogen atom or lower alkyl group, Y is $-(CH_2)_m-$ or

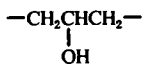

and $m$ is 1, 2 or 3, and quaternary ammonium salts thereof. Preferable examples of such compounds are 2-aminoethyl acrylate, 2-aminoethyl methacrylate, 2-methylaminoethyl acrylate, 2-methylaminoethyl methylacrylate, 2-dimethylaminoethyl acrylate, 2-dimethylaminoethyl methylacrylate, 3-dimethylamino-2-hydroxypropyl acrylate, 3-dimethylamino-2-hydroxypropyl methacrylate, etc.

3. Aminoalkyl amides of acrylic acid or of methacrylic acid represented by the formula

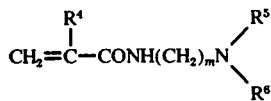

wherein $R^4$, $R^5$, $R^6$ and $m$ are as defined above, and quaternary ammonium salts thereof. The preferable examples of such compounds are dimethylaminoethyl acrylamide, dimethylaminoethyl methacrylamide, diethylaminoethyl acrylamide, diethlaminoethyl methacrylamide, dimethylaminopropyl acrylamide, dimethylaminopropyl methacrylamide, diethylaminopropyl acrylamide, diethylaminopropyl methacrylamide, etc.

4. Alkyl amine acryl imides and alkyl amine methacryl imides represented by the formula

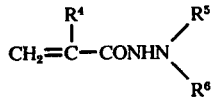

wherein $R^4$, $R^5$ and $R^6$ are as defined above, and quaternary ammonium salts thereof. Preferable examples of such compounds are dimethyl amine acryl imide, dimethyl amine methacryl imide, diethyl amine acryl imide, diethyl amine methacryl imide, etc.

5. Vinyl imidazole derivatives represented by the formula

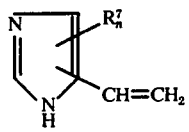

wherein $R^7$ is hydrogen atom or lower alkyl group and $n$ is 0, 1, 2 or 3. Preferable examples of such compounds are N-vinyl imidazole, 2-methyl-N-vinyl imidazole, 2-vinyl imidazole, etc.

Preferable among the ethylenically unsaturated amino compounds are allyl amine, dimethylaminoethyl methacrylate, diethylaminoethyl methacrylate, 3-dimethylamino-2-hydroxypropyl methacrylate, dimethylaminoethyl acrylamide and N-vinyl imidazole. Especially preferable of these are allyl amine, dimethylaminoethyl methacrylate and diethylaminoethyl methacrylate.

These ethylenically unsaturated amino compounds can be used alone in in admixture with one another.

The reaction of this invention is carried out in a conventional manner. For example, the starting materials are reacted at a temperature of 170° to 300° C, preferably of 210° to 280° C, for thermal polymerization. If the reaction is conducted at a temperature of below 170° C, the amino resin obtained contains a large amount of waxy low molecular weight polymers and is not readily soluble in a solvent, hence undesirable. When the reaction is conducted at a temperature of above 300° C, an insoluble and unmeltable high molecular weight polymer is produced which is easily soluble in a solvent and is therefore undesirable. The reaction is carried out in an open or closed vessel generally for 30 minutes to 30 hours.

The starting materials are used preferably in the ratio of 0.5 to 20 moles, more preferably 3 to 12 moles, of alicyclic conjugated polyene calculated as polyene monomer per mole of ethylenically unsaturated amino compound.

The alicyclic conjugated polyene is reacted with the ethylenically unsaturated amino compound at a time, or the alicyclic conjugated polyene is reacted with the ethylenically unsaturated amino compound to prepare an addition product thereof, which is then reacted with the alicyclic conjugated polyene or with a polymer of alicyclic conjugated polyene. Alternatively, a polymer of alicyclic conjugated polyene is reacted with the ethylenically unsaturated amino compound. The reaction may be conducted in any of these manners insofar as the alicyclic conjugated polyene and ethylenically unsaturated amino compound can be substantially reacted with each other.

The reaction is effected in the presence or absence of solvent. Usable as the solvent are organic solvents such as benzene, toluene, xylene, cyclohexane, butyl acetate, methyl ethyl ketone, methyl isobutyl ketone, tetrahydrofuran, carbon tetrachloride, trichloroethylene, dichloroethane, chlorobenzene, etc. A chain transfer agent and antioxidant are also usable to prevent the formation of resin which is insoluble in solvent and to prevent coloration.

(II) Thermal polymerization of alicyclic conjugated polyene compound and $\alpha,\beta$-ethylenically unsaturated nitrile to prepare a nitrile-containing copolymer, followed by hydrogenation of the copolymer to reduce the nitrile group.

Usable as the alicyclic conjugated polyene compound are those enumerated in the method (I).

The $\alpha,\beta$-ethylenically unsaturated nitriles are unsaturated mononitriles and dinitriles represented by the formula

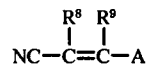

wherein $R^8$ and $R^9$ are each hydrogen atom or $CH_3$ group, and A is hydrogen atom or $-CN$. Preferable examples of such compounds are acrylonitrile, methacrylonitrile, crotononitrile, maleonitrile, fumaronitrile, etc. These α,β-ethylenically unsaturated nitriles can be used alone or in admixture with one another.

The polymerization conditions, order of charging the starting materials and solvents to be used in carrying out this thermal polymerization are the same as in the process (I) except that α,β-ethylenically unsaturated nitrile is used instead of ethylenically unsaturated amino compound.

The starting materials are used preferably in the ratio of 0.5 to 20 moles, more preferably 3 to 12 moles, of alicyclic conjugated polyene compound calculated as polyene monomer per mole of α,β-ethylenically unsaturated nitrile.

The nitrile group contained in the nitrile-containing copolymer obtained is then reduced in a known manner, for example, by placing the copolymer into a vessel and using a hydrogenating catalyst or reducing agent in the presence or absence of solvent.

Examples of the hydrogenating catalyst are nickel, cobalt, palladium, platinum, copper, iron and oxides and hydroxides thereof. Exemplary of the reducing agent are lithium aluminum hydride and sodium borohydride.

Use of a hydrogenating catalyst such as the above-mentioned metal or oxide or hydroxide thereof yields amino resin which is mainly primary amine, but during hydrogenation reaction a side reaction may proceed to remove ammonia therefrom to give secondary or teritary amine. By introducing ammonia gas into the reaction system during hydrogenation, such side reaction can be prevented.

Use of a reducing agent such as lithium aluminum hydride or sodium borohydride produces amino resin which is composed of primary amine without permitting the above-mentioned side reaction.

The conditons of the hydrogenation reaction are suitably determined depending on which of the above hydrogenating catalyst and reducing agent is used. For example, when a hydrogenating catalyst such as metal or oxide or hydroxide thereof is used, it is preferable to conduct hydrogenation at a hydrogen pressure of 1 to 300 kg/cm² and at a temperature of 30° to 300° C for 1 to 10 hours. The catalyst is used for example in the ratio of 0.005 to 0.2 g per gram of the copolymer. Further when a reducing agent such as lithium aluminum hydride or sodium borohydride is used, the reaction is preferably carried out at a temperture of −10° to 100° C for 10 minutes to 10 hours. The reducing agent may be used for example in an amount of 0.1 to 2 moles per mole of the nitrile group in the polymer.

The reaction can be effected either in an open vessel or in a closed vessel in the absence or presence of solvent. Examples of the solvent to be used are ethanol, propanol, butanol, n-hexane, cyclohexane and tetrahydrofuran when the hydrogenating catalyst is used, and n-hexane, cyclohexane and tetrahydrofuran if the reducing agent is employed.

The hydrogenation may be effected completely or partially, the hydrogenation conditions being such that the cationic amino resin produced will have an amine value of 20 to 700, preferably 40 to 400.

The cationic amino resins prepared by the processes (I) and (II) have a weight average molecular weight which is at least 400, generally 400 to 10,000, more preferably 500 to 5,000 and an amine value of 20 to 700, preferably of 40 to 400. Preferably such cationic amino resins have a number average molecular weight of at least 250, generally of 250 to 5,000, more preferably of 400 to 2,000.

The cationic amino resins thus obtained are advantageous to use as paper making sizing agents and for various applications already stated.

If the weight average molecular weight is lower than 400, resins are inferior in sizing effect, water repellency and fixing ability, while if the amine value is not in the range of 20 to 700, various objections will be encountered when using the resins as sizing agents as will be described later.

In the thermal polymerization reaction of the processes (I) and (II) to prepare resins, nonionic copolymerizable monovinyl compounds are usable to obtain terpolymers.

Copolymerization with such nonionic copolymerizable monovinyl compound achieves various outstanding results that the cationic amino resin obtained has a higher molecular weight and is yet soluble in solvent and involves less variations in the sizing degree when used as a sizing agent for making paper.

The nonionic copolymerizable monovinyl compounds include various compounds exemplified below.

(1) Monovinyl compounds respresented by the formula

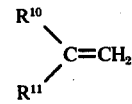

wherein $R^{10}$ is hydrogen or methyl group and $R^{11}$ is hydrogen atom, lower alkyl group, phenyl, tolyl, xylyl, RCOO— or —COOR, R being lower alkyl group. The preferable of such compounds are, for example, styrene, α-methylstyrene, vinyltoluene, vinylxylene, vinyl acetate, vinyl propionate, vinyl butyrate, methyl acrylate, ethyl acrylate, methyl methacrylate, ethyl methacrylate, etc.

(2) Indene derivatives represented by the formula

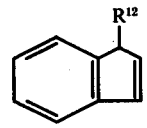

wherein $R^{12}$ is hydrogen atom or lower alkyl group. Preferable examples of such compounds are indene, methylindene, ethylindene, etc.

Among the foregoing nonionic copolymerizable monovinyl compounds, styrene, methyl methacrylate and vinyl acetate are preferable, and especially preferable is styrene. The nonionic copolymerizable monovinyl compounds can be used alone or in mixture with one another.

When the reaction is conducted according to the process (I) to prepare a terpolymer, the starting materials are advantageously used in the ratio of 0.25 to 20 moles, preferably 3 to 12 moles, of alicyclic conjugated polyene compound calculated as polyene monomer and 0.25 to 10 moles, preferably 0.5 to 6 moles, of the nonionic copolymerizable monovinyl compound per mole of ethylenically unsaturated amino compound. Further if the reaction is conducted according to the process (II) to prepare a terpolymer, the preferred ratio of the starting materials is 0.25 to 20 moles, more preferably 3 to 12 moles, of alicyclic conjugated polyene compound calculated as polyene monomer and 0.25 to 10 moles, more preferably 0.5 to 6 moles of the nonionic copolymerizable monovinyl compound per mole of α,β-ethyleneically unsaturated nitrile.

When alicyclic conjugated polyene compound, ethylenically unsaturated amino, compound and nonionic copolymerizable monovinyl compound are subjected to thermal polymerizable to produce a terpolymer according to the process (I), these three materials are reacted at a time, or alicyclic conjugated polyene and ethylenically unsaturated amino compound are reacted to form an addition product thereof, which is then reacted with a nonionic copolymerizable monovinyl compound, or alicyclic conjugated polyene is reacted with nonionic copolymerizable monovinyl compound to produce an addition product thereof, which is then reacted with ethylenically unsaturated amino compound. Furthermore an addition product of alicyclic conjugated polyene and ethylenically unsaturated amino compound is reacted with an addition product of alicyclic conjugated polyene and nonionic copolymerizable monovinyl compound. Thus any of these procedures may be adopted which substantially react the three materials.

Further when the three starting materials, i.e. alicyclic conjugated polyene compound, α,β-ethylenically unsaturated nitrile and nonionic copolymerizable monovinyl compound are subjected to thermal polymerization, they may be reacted in the same manner as above, with the ethylenically unsaturated amino compound replaced by αβ-ethylenically unsaturated nitrile.

The reaction is conducted under the same conditions as in the processes (I) and (II).

The cationic amino resin thus prepared and containing nonionic copolymerizable monovinyl compound has a weight average molecular weight of at least 400, generally of 400 to 1,000,000, preferably of 500 to 200,000 and an amine value in the range of 20 to 700, preferably of 40 to 400. Advantageously, the cationic amino resin has a number average molecular weight of at least 250, generally of 250 to 100,000, more advantageously 400 to 20,000.

The cationic amino resins of this invention are resinous compounds which have the bulky structure and have various weight average molecular weight and amine values dependent on the starting materials and reaction conditions. The cationic amino resins are reacted with an inorganic acid such as hydrochloric acid, sulfuric acid, nitric acid or the like, or an organic acid such as formic acid, acetic acid or the like to prepare the salts thereof. Thus they are used in the form of water-soluble or water-dispersible resins for example as paper making sizing agents, paper strengthening agents, retention aids, water repellent agents for fiber boards, fixing agents in the process for making paper or fiber boards (as substitutes for alum), etc. The cationic amino resins as dissoved in organic solvents are usable for adhesives, agents for imparting water resistance to nonwoven fabrics, antistatic agents, electroconductive agents, etc.

The uses of the cationic amino resins are classified according to the amine value thereof.

The cationic amino resins having an amine value of 40 to 150, preferably of 70 to 130, are usable as paper making sizing agents and water repellent agent for fiber boards. Those having an amine value of less than 40 have low water-dispersibility, whereas those with an amine value in excess of 150 exhibit poor sizing effect and water repellency.

The cationic amino resins having an amine value of 70 to 700, preferably of 70 to 400, are suitable for use as substitutes for alum to be used as fixing agent in the process for making paper or fiber boards. Those having an amine value of below 70 or above 700 have a poor fixing ability.

The cationic amino resins having an amine value of 20 to 400, preferably of 40 to 300, are usable as electroconductive agents. Those having an amine value of less than 20 fail to effectively give cationic properties, whilst those with an amine value of higher than 400 are poor in electroconductive properties and like electrical characteristics and prone to thermal degradation.

The amino resins described are applied in the form of solution or dispersion to paper, fiber boards and nonwoven fabrics by coating, dipping or spraying. Alternatively, they are used as wet end additives for making paper or fiber boards.

The cationic amino resin of this invention may further be reacted with an alkylating agent to prepare a useful cationic amino resin which is more excellent for use as a paper making sizing agent.

The alkylation can be conducted in a usual known manner preferably in an organic solvent or aqueous solution in the presence or absence of an inorganic or organice acid.

Various compounds given below are usuable as the alkylating agent.

1. Halogen-containing compounds represented by the formula $R^{13}$-B wherein $R^{13}$ is lower alkyl group, benzyl or phenoxyethyl and B is halogen atom. Preferable examples of such compounds are methyl chloride, ethyl chloride, propyl chloride, benzyl chloride, phenoxyethyl chloride or bromides and iodides corresponding to these chlorides.

2. Dialkyl sulfites and dialkyl sulfates represented by the formula $(R^{14}O)_2SO_v$, wherein $R^{14}$ is lower alkyl group and v is 1 or 2. Preferable among such compounds are for example dimethyl sulfate, diethyl sulfate, dimethyl sulfite, diethyl sulfite, etc.

3. Ethylene oxide derivatives represented by the formula

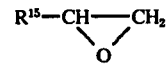

wherein $R^{15}$ is hydrogen atom, lower alkyl or phenyl group. Preferable among these compounds are ethylene oxide, propylene oxide, butylene oxide, styrene oxide, etc. These foregoing compounds used as the alkylating agent can be use alone or in admixture with one another.

The alkylation reaction is conducted in a known manner. For example, the cationic amino resin is preferably reacted with an alkylating agent in the ratio of 0.5 to 10 moles of the latter per mole of amino group in the former at a temperature of 30° to 100° C for 10 minutes to 10 hours. This reaction can be effected in the presence or absence of an organic solvent. Usuable as the organic solvent are benzene, toluene, xylene, cyclohexane, methyl ethyl ketone, tetrahydrofuran, carbon tetrachrloride, etc. The alkylated cationic amino resin thus prepared has in its structure secondary amino group, tertiary amino group and/or quaternary ammonium salt and is similarly employable for applications described. As the reaction proceeds, giving secondary amine, tertiary amine and then quaternary ammonium salt, the resulting cationic resin has higher heat resistance and becomes less susceptible to the influence of pH when rendered water-soluble or water-dispersible. Accordingly, the alkylated cationic amino resin has the outstanding feature that it can be used at any pH level as a wet end additive for making paper or fiber boards.

The cationic amino resins thus obtained which contain primary, secondary and tertiary amino groups may further be reacted wth halohydrin and epihalohydrin and thereby made into thermosetting cationic amino resins which are more excellent for use as paper making sizing agents.

Examples of halohydrin and epihalohydrin are versatile as given below.

1. Epihalohydrins represented by the formula

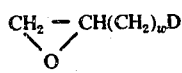

wherein D is halogen atom and w is 1, 2 or 3. Preferable examples are epichlorohydrin, epibromohydrin, etc.

2. Monohalohydrins represented by the formula $HOCH_2(CH_2)_wD$ wherein D and w are as defined above, preferable examples being ethylene chlorohydrin, ethylene bromohydrin, etc.

3. Dihalohydrins represented by the formula

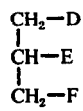

wherein D is as defined above, E is halogen atom or OH group, F is OH group when E is halogen atom or halogen atom when E is OH group. Preferable among such compounds are 1,3-dichloro-2-propanol, 2,3-dichloro-1-propanol, etc.

Among these halohydrins and epihalohydrins, epichlorohydrin is especially preferable. These halohydrins or epihalohydrins can be used alone or in admixture with one another.

The reaction of the resin with the above-mentioned halohydrin or epihalohydrin can be conducted in a usual known manner under the same reaction conditions as in the foregoing alkylation, with the alkylating agent replaced by the halohydrin or epihalohydrin.

Because of the thermosetting properties, the cationic amino resin thus obtained is reacted with hydroxyl groups in cellulose, resulting a very high effect as a sizing agent and an agent for strengthening paper. It is also applicable as a substitute for alum to be used as a wet end additive for making paper and fiber boards.

For a better understanding of this invention examples are given below, in which the molecular weight was determined using the gel permeation chromatograph under the following analysis conditions.

Apparatus: — "Shimadzu Gel Permeation Chromotograph, Model, IA" (Manufactured by Shimadzu Seisakusho Limited, Japan)
Sample: — 0.3 wt. % solution in tetrahydrofuran
Injection amount: 2.0 ml
Injection time: — 2 minutes
Flow rate: — 1 ml/min.
Gel column: — SG 3-2-1-1. The pore sizes of four gel columns, SG 3-2-1-1, are $4 \times 10^3 A$, $2 \times 10^2 A$, $2 \times 10 A$ and $2 \times 10 A$ respectively.

The molecular weights were all determined as calculated as polystyrene and the percentages are all by weight.

EXAMPLE 1 a. Into a 1-liter autoclave equipped with a stirrer were placed 226 g of dicyclopentadiene, 24 g of allyl amine and 250 g of cyclohexane, and the air in the autoclave was replaced by nitrogen gas. Subsequently, the mixture was heated with stirring and reacted at 220° C for 2 hours and then at 260° C for 2 hours. After the completion of reaction, the reaction mixture was cooled and taken out, and cyclohexane, unreacted substances and low-boiling substances were distilled off therefrom at a reduced pressure to obtain 175 g of cationic amino resin having a softening point of 70° C, number average molecular weight of 423, weight average molecular weight of 703 and total amine value of 79.

b. Into a 500-ml three-necked flask equipped with a stirrer, reflux condenser and thermometer were placed 20 g of the amino resin, 3.4 g of glacial acetic acid and 180 g of water, and the mixture was heated at 90° C for 1 hour to prepare an aqueous solution having a pH of 4.7 and 10.3% in the concentration of nonvolatile substances.

EXAMPLE 2

Into a 200-ml three-necked flask equipped with a stirrer, reflux condenser and thermometer were placed 100 g of the aqueous solution obtained in Example 1 and 15 g of epichlorohydrin, and the mixture was reacted at 60° C for 3 hours to prepare an aqueous solution having a pH of 6.0 and 11.5% in the concentration of nonvolatile substances.

EXAMPLE 3 a. Into a 1-liter autoclave equipped with a stirrer were placed 193 g of dicyclopentadiene, 58 g of 2-dimethylaminoethyl methacrylate and 250 g of cyclohexane, and the air in the autoclave was replaced by nitrogen gas. Subsequently, the mixture was reacted at 220° C for 2 hours and then at 260° C for 4 hours. After the completion of reaction, the reaction mixture was taken out, and cyclohexane, unreacted substances and low-boiling substances were distilled off therefrom at a reduced pressure to obtain 201 g of cationic amino resin having a softening point of 85° C, number average molecular weight of 829, weight average molecular weight of 2,350 and total amine value of 80.

b. A 20 g portion of the amino resin was treated with 6.8 g of glacial acetic acid and 220 g of water at 90° C for 1 hour to prepare an aqueous solution having a pH of 3.8 and 10.3% in the concentration of nonvolatile substances.

c. A 100 g quantity of the aqueous solution and 5.3 g of epichlorohydrin were reacted at 60° C for 3 hours to prepare an aqueous solution having a pH of 4.9 and 11.2% in the concentration of nonvolatile substances.

EXAMPLE 4 a. Into an autoclave were placed 170 g of dicyclopentadiene, 80 g of 2-diethylaminoethyl methacrylate and 250 g of cyclohexane, and the air in the autoclave was replaced by nitrogen gas. Subsequently, the mixture was reacted at 220° C for 2 hours and then at 260° C for 4 hours. After the completion of reaction, the reaction mixture was taken out, and cyclohexane, unreacted substances and low-boiling substances were distilled off therefrom at a reduced pressure to obtain 225 g of cationic amino resin having a softening point of 80° C, number average molecular weight of 868, weight average molecular weight of 1,620 and total amine value of 99.

EXAMPLE 5

Into an autoclave were placed 145 g of dicyclopentadiene, 114 g of styrene, 42 g of allyl amine and 300 g of cyclohexane, and the air in the autoclave was replaced by nitrogen gas. Subsequently, the mixture was reacted at 220° C for 2 hours and then at 260° C for 4 hours. After the completion of reaction, the reaction mixture was taken out, and cyclohexane, unreacted substances and low-boiling substances were distilled off therefrom at a reduced pressure to obtain 226 g of cationic amino resin having a softening point of 63.5° C, number average molecular weight of 734, weight average molecular weight of 3,900 and total amine value of 75.

A 20 g portion of the amino resin was treated with 2.4 g of glacial acetic acid and 200 g of water at 90° C for 1 hour to prepare an aqueous solution having a pH of 4.6 and 8.4% in the concentration of nonvolatile substances.

EXAMPLE 6

A 100 g quantity of the aqueous solution obtained in Example 5 and 6.1 g of eqichlorohydrin were reached at 60° C for 3 hours to prepare an aqueous solution having a pH of 5.0 and 10.9% in the concentration of nonvolatile substances.

EXAMPLE 7

Into an autoclave were placed 37 g of dicyclopentadiene, 175 g of styrene, 88 g of 2-dimethylaminoethyl methacrylate and 300 g of cyclohexane, and the air in the autoclave was replaced by nitrogen gas. Subsequently, the mixture was reacted at 220° C for 2 hours and then at 260° C for 4 hours. After the completion of reaction, the reaction mixture was taken out, and cyclohexane, unreacted substances and low-boiling substances were distilled off therefrom at a reduced pressure to obtain 270 g of cationic amino resin having a softening point of 65° C, number average molecular weight of 1,330, weight average molecular weight of 4,610 and total amine value of 94.

A 20 g portion of the amino resin was treated with 3.0 g of glacial acetic acid and 400 g of water at 90° C for 1 hour to prepare an aqueous solution having a pH of 4.5 and 5.2% in the concentration of nonvolatile substances.

A 100 g quantity of the aqueous solution thus obtained and 2.3 g of epichlorohydrin were reacted at 60° C for 3 hours to prepare an aqueous solution having a pH of 4.8 and 5.4% in the concentration of nonvolatile substances.

Example 8

Into an autoclave were placed 192 g of cyclopentadiene and 208 g of allyl amine, which were reacted at 170° C for 8 hours. The reaction mixture was taken out and distilled to remove cyclohexane and unreacted substances. Under the distillation conditions of 70 to 74° C/15mm HG, 136g of an oily product was obtained. The infrared absorption spectrum analysis of the product indicated absorption at 3,400 cm$^{-1}$ due to the presence of —NH$_2$ and absorption at 715 cm$^{-1}$ due to the presence of the double bond of norbornene ring. Further gel permeation chromatography revealed a single sharp peak at 33.9 count.

The oily product has a total amine value of 470 and bromine value of 143, the theoretical values of total amine value and bromine value being 455.4 and 129.7 respectively.

The oily product was identified as a 1 molecule: 1 molecule addition product of cyclopentadiene and allyl amine, i.e., 2-aminomethyl-5-norbornene.

Into an autoclave were placed 86 g of the oily product, 92 g of dicyclopentadiene, 146 g of styrene and 324 g of cyclohexane, and the air in the autoclave was replaced by nitrogen gas. Subsequently, the mixture was reacted at 220° C for 2 hours and then at 260° C for 2 hours. After the completion of reaction, the reaction mixture was taken out, and cyclohexane, unreacted substances and low-boiling substances were distilled off therefrom to obtain 220 g of cationic amino resin having a softening point of 45° C, number average molecular weight of 650, weight average molecular weight of 2,260 and total amine value of 87.

A 20 g portion of the amino resin was treated with 2.8 g of glacial acetic acid and 180 g of water at 60° C for 30 minutes to prepare an aqueous solution having a pH of 4.5 and 10.5% in the concentration of nonvolatile substances.

EXAMPLE 9

A 100 g quantity of the aqueous solution obtained in Example 8 and 5.7 g of epichlorohydrin were reacted at 60° C for 3 hours to prepare an aqueous solution having a pH of 5.1 and 12.5% in the concentration of nonvolatile substances.

EXAMPLE 10

Into an autoclave were placed 130 g of dicyclopentadiene, 132 g of methyl methacrylate, 38 g of allyl amine and 300 g of cyclohexane, and the air in the autoclave was replaced by nitrogen gas. Subsequently, the mixture was reacted at 220° C for 2 hours and then at 260° C for 2 hours. After the completion of reaction, the reaction mixture was taken out, and cyclohexane, unreacted substances and low-boiling substances were distilled off therefrom to obtain 180 g of cationic amino resin having a softening point of 66° C, number average molecular weight of 756, weight average molecular weight of 1,440 and total amine value of 73.

EXAMPLE 11 a. Into a 1-liter autoclave equipped with a stirrer were placed 452.4 g of dicyclopentadiene, 72.6 g of acrylonitrile and 175 g of xylene, and the air in the autoclave was replaced by nitrogen gas. Subsequently, the mixture was heated with stirring and reacted at 260° C for 6 hours. After the completion of reaction, the reaction mixture was cooled and taken out, and xylene, unreacted substances and low-boiling substances were distilled off therefrom at a reduced pressure to obtain 490 g of resinous product having a softening point of 150° C, and number average molecular weight of 810 and weight average molecular weight of 1,560.

b. Into a 2-liter autoclave were placed 400 g of the resinous product, 600 g of tetrahydrofuran and 80 g (40 g in solids) of Raney nickel catalyst soaked in n-butanol and the air in the autoclave was replaced by nitrogen gas. Subsequently, 40 ml of liquid ammonia was placed into the system and then hydrogen gas was introduced thereinto until the interior pressure reached 100 kg/cm², followed by heating with stirring. While further supplying hydrogen gas so as to maintain the interior pressure at 180 to 200 kg/cm², the mixture was reacted at 200° C for 3 hours. After cooling, the reaction mixture was taken out, filtered to remove the catalyst and then distilled at a reduced pressure to remove tetrahydrofuran, unreacted substances and low-boiling substances, whereby 380 g of cationic amino resin was obtained which had a softening point of 150° C, number average molecular weight of 648, weight average molecular weight of 1,750 and total amine value of 105.

c. Into a 500-ml three-necked flask equipped with a stirrer, reflux condenser and thermometer were placed 50 g of the amino resin, 8.5 g of glacial acetic acid and 191.5 g of water, and the mixture was heated at 90° C for 3 hours to prepare an aqueous solution having a pH of 4.7 and 22.7% in the concentration of nonvolatile substances.

EXAMPLE 12

Into a 200-ml three-necked flask equipped with a stirrer, reflux condenser and thermometer were placed 100 g of the aqueous solution obtained in Example 11 and 10.4 g of epichlorohydrin, and the mixture was reacted at 60° C for 3 hours to prepare an aqueous solution having a pH of 5.9 and 26.6% in the concentration of nonvolatile substances.

EXAMPLE 13 a. Into a 1-liter autoclave equipped with a stirrer were placed 251 g of dicyclopentadiene, 29 g of acrylonitrile and 420 g of cyclohexane, and the air in the autoclave was replaced by nitrogen gas. Subsequently, the mixture was heated with stirring and reacted at 230° C for 2 hours and then at 260° C for 2 hours. After the completion of reaction, the reaction mixture was cooled and taken out, and cyclohexane, unreacted substances and low-boiling substances were distilled off therefrom at a reduced pressure to obtain 224 g of resinous product having a softening point of 75° C, number average molecular weight of 420 and weight average molecular weight of 770.

b. Into a 1-liter autoclave were placed 50 g of the resinous product, 300 g of tetrahydrofuran and 5 g (3 g in solids) of Raney nickel catalyst soaked in isopropyl alcohol, and the air in the autoclave was replaced by nitrogen gas. Subsequently, 15 ml of liquid ammonia was placed into the system and then hydrogen gas was introduced thereinto until the interior pressure reached 100 kg/cm², followed by heating with stirring. While maintaining the interior pressure at 180 to 200 kg/cm², the mixture was reacted at 220° C for 3 hours. After cooling, the reaction mixture was taken out, filtered to remove the catalyst and then distilled at a reduced pressure to remove tetrahydrofuran, whereby 48 g of cationic amino resin was obtained which had a softening point of 60° C, number average molecular weight of 530, weight average molecular weight of 880 and total amine value of 85.

c. In the same manner as in Example 11 (c) except that 30 g of the above amino resin, 5.5 g of glacial acetic acid and 400 g of water were used, an aqueous solution was prepared which had a pH of 4.4 and was 7.7% in the concentration of nonvolatile substances.

EXAMPLE 14

In the same manner as in Example 12 except that 130 g of aqueous solution obtained in Example 13(c), 2.8 g of epichlorohydrin and 70 g of water were used, an aqueous solution was prepared which had a pH of 4.8 and was 5.6% in the concentration of nonvolatile substances.

EXAMPLE 15

Into a 200-ml four-necked flask equipped with a 50-ml dropping funnel, stirrer, reflux condenser and thermometer were placed 20 g of the cationic amino resin obtained in Example 13(b) and 15 g of cyclohexane to dissolve the amino resin, and 15 g of n-amyl alcohol was added to the solution, followed by heating at 50 to 60° C. Over a period of 30 minutes, 15 g of methyl iodide was added dropwise to the mixture by the dropping funnel, and the resulting mixture was reacted further at 60 to 70° C for 3 hours. To the reaction mixture cooled after the reaction was added 40 g of benzene. The mixture was then washed with 50 g of 2% aqueous ammonia solution twice and with 50 g of water three times. The solvent was then distilled off at a reduced pressure to obtain 26.7 g of cationic amino resin having a number average molecular weight of 630, weight average molecular weight of 990 and total amine value of 70.

Subsequently in the same manner as in Example 11 (c) except that 10 g of the amino resin, 1.5 g of glacial acetic acid and 100 g of water were used, an aqueous solution was prepared which had a pH of 4.3 and was 9.5% in the concentration of nonvolatile substances.

EXAMPLE 16 a. In the same manner as in Example 13(a) except that 264.6 g of dicyclopentadiene, 35.4 g of acrylonitrile and 450 g of cyclohexane were used to conduct reaction at 230° C for 2 hours and then at 260° C for 2 hours and then at 260° C for 4 hours, 273 g of a resinous product was obtained which had a softening point of 111° C, number average molecular weight of 624 and weight average molecular weight of 1,140.

b. Into a 1-liter four-necked flask equipped with a 100 ml dropping funnel, stirrer, reflux condenser and thermometer was placed 300 ml of anhydrous tetrahydrofuran dehydrated with sodium metal and then with LiAlH₄, and 3.8 of LiAlH₄ was further added. While introducing nitrogen gas into the flask with stirring and icecooling, a solution of 45 g of the resinous product in 50 ml of anhydrous tetrahydrofuran was added dropwise to the mixture by the dropping funnel over a period of 20 minutes. After the completion of the dropwise addition, the mixture was made to react under reflux for 3 hours. To the resulting reaction mixture were added 10 ml of water and then 10 ml of 20% aqueous solution of caustic soda, followed by vigorous stirring to decompose the catalyst and thereafter by the addition of 10 ml of water. The resulting mixture was subjected to extraction with 200 ml of benzene three times, dried over magnesium sulfate and distilled at a reduced pressure to remove the solvent, whereby 32 g of cationic amino resin was obtained which had a softening point of 105° C, number average molecular weight of 650, weight average molecular weight of 1,300 and total amine value of 121.

c. In the same manner as in Example 11(c) except that 50 g of the amino resin, 13.0 g of glacial acetic acid and 500 g of water were used, an aqueous solution was obtained which had a pH of 4.3 and was 10.0% in the concentration of nonvolatile substances.

EXAMPLE 17 a. Using 166 g of dicyclopentadiene, 134 g of acrylonitrile and 200 g of xylene, reaction was conducted at 180° C for 2 hours. The solvent and unreacted substances were distilled off from the resulting reaction mixture to obtain 285 g of a liquid boiling at 81 to 86° C/10 mm Hg and melting at 5° C.

The liquid exhibited absorptions at 2,250 cm$^{-1}$ and 715 cm$^{-1}$ due to the presence of -CN and norbornene ring respectively when subjected to infrared absorption spectrum analysis, contained 11.98% of nitrogen as determined by Kjeldahl method, had a bromine value of 133 as determined by McIlhiney method and displayed a single sharp peak at 32.5 count by gel permeation chromatography. From these findings, the liquid was identified as 2-cyano-5-norbornene of 1 molecule: 1 molecule addition product of cyclopentadiene and acrylonitrile.

b. In the same manner as in Example 13(a) except that 58 g of the 1 molecule: 1 molecule addition product of cyclopentadiene and acrylonitrile, 192 g of dicyclopentadiene and 250 g of cyclohexane were used to react them at 220° C for 2 hours and then at 260° C for 2 hours, 215 g of a resinous product was obtained which had a softening point of 78.5° C, number average molecular weight of 500 and weight average molecular weight of 780.

In the same manner as in Example 13(b) except that 50 g of the resinous product, 250 g of tetrahydrofuran and 5 g (3 g in solids) of Raney nickel catalyst soaked in isopropyl alcohol were used to conduct reaction at 200° C for 3 hours, 47.5 g of cationic amino resin was obtained which had a softening point of 83° C, number average molecular weight of 408, weight average molecular weight of 620 and total amine value of 82.

c. Subsequently in the same manner as in Example 11(c) except that 25 g of the amino resin, 4.4 g of glacial acetic acid and 250 g of water were used, an aqueous solution was prepared which had a pH of 4.2 and was 9.7% in the concentration of nonvolatile substances.

EXAMPLE 18

Into a 100-ml of four-necked flask equipped with a 20-ml dropping funnel, stirrer, reflux condenser and thermometer were placed 20 g of the cationic amino resin obtained in Example 17(b) and 10 g of n-butyl alcohol to dissolve the amino resin at a temperature of 60° C. Over a period of 30 minutes, a solution prepared by dissolving 4 g of dimethyl sulfate in 10 ml of n-butyl alcohol was added dropwise to the solution by the dropping funnel at 60° to 65° C. The resulting mixture was progressively heated at 100° C over a period of 1 hour and then cooled. To the reaction mixture was added 40 g of benzene. The mixture was then washed with 30 g of 5% aqueous ammonia solution twice and with 50 ml of water three times. The solvent was then distilled off at a reduced pressure to obtain 24 g of cationic amino resin having a softening point of 80° C, number average molecular weight of 440, weight average molecular weight of 650 and total amine value of 73.

Subsequently in the same manner as in Example 11(c) except that 10 g of the amino resin, 1.6 g of glacial acetic acid and 90 g of water were used, an aqueous solution was prepared which had a pH of 5.0 and was 10.4% in the concentration of nonvolatile substances.

Following the same procedure as in Example 12 except that 50 g of the aqueous solution and 1.5 g of epichlorohydrin were used, an aqueous solution was prepared which had a pH of 5.8 and was 11.0% in the concentration of nonvolatile substances.

EXAMPLE 19

In the same manner as in Example 13(a) except that 328 g of dicyclopentadiene, 22 g of acrylonitrile and 350 g of cyclohexane were used to react them at 220° C for 2 hours and then at 260° C for 1 hour, 323 g of a resinous product was obtained which had a softening point of 80° C, number average molecular weight of 670 and weight average molecular weight of 1,010.

In the same manner as in Example 13(b) except that 30 g of the resinous product, 255 g of cyclohexane, 3 g (1.8 g in solids) of Raney nickel catalyst soaked in isopropyl alcohol and 9 ml of liquid ammonia were used to conduct reaction at 200° C for 3 hours, 30 g of cationic amino resin was obtained which had a softening point of 70° C, number average molecular weight of 410, weight average molecular weight of 734 and total amine value of 52.

Subsequently in the same manner as in Example 11(c) except that 10 g of the amino resin, 3 g of glacial acetic acid and 90 g of water were used, an aqueous solution was prepared which had a pH of 4.0 and was 9.5% in the concentration of nonvolatile substances.

EXAMPLE 20

In the same manner as in Example 13(a) except that 107 g of dicyclopentadiene, 13 g of fumaronitrile and 180 g of cyclohexane were used to react them at 220° C for 2 hours and then at 260° C for 2 hours, 72 g of a resinous product was obtained which had a softening point of 72° C, number average molecular weight of 601 and weight average molecular weight of 1,500.

In the same manner as in Example 13(b) except that 60 g of the resinous product, 540 g of tetrahydrofuran and 6 g (3 g in solids) of Raney nickel catalyst soaked in isopropyl alcohol were used, 55 g of cationic amino resin was obtained which had a softening point of 60° C, number average molecular weight of 493, weight average molecular weight of 1,070 and total amine value of 100.

Subsequently in the same manner as in Example 11(c) except that 20 g of the amino resin, 2.5 g of glacial acetic acid and 180 g of water were used, an aqueous solution was prepared which had a pH of 3.9 and was 9.5% in the concentration of nonvolatile substances.

EXAMPLE 21

In the same manner as in Example 13(a) except that 70 g of 1,3,5-cycloheptatriene, 10 g of acrylonitrile and 120 g of cyclohexane were used to react them at 220° C for 2 hours and then at 260° C for 4 hours, 32 g of a resinous product was obtained which had a softening point of 85° C, number average molecular weight of 464 and weight average molecular weight of 1,100.

In the same manner as in Example 13(b) except that 20 g of the resinous product, 180 g of tetrahydrofuran, 2 g (1 g in solids) of Raney nickel catalyst soaked in isopropyl alcohol and 5 ml of liquid ammonia were used, 18 g of cationic amino resin was obtained which had a softening point of 75° C, number average molecular weight of 527, weight average molecular weight of 888 and total amine value of 116.

Subsequently in the same manner as in Example 11(c) except that 10 g of the amino resin, 2.5 g of glacial acetic acid and 100 g of water were used, an aqueous solution was prepared which had a pH of 4.0 and was 9.3% in the concentration of nonvolatile substances.

EXAMPLE 22

In the same manner as in Example 13(a) except that 50 g of the 1 molecule: 1 molecule addition product of cyclopentadiene and acrylonitrile obtained in Example 17(a), 112 g of dicyclopentadiene, 88 g of styrene and 250 g of cyclohexane were used to react them at 220° C for 2 hours and then at 260° C for 2 hours, 175 g of a resinous product was obtained which had a softening point of 58° C, number average molecular weight of 490 and weight average molecular weight of 1,320.

In the same manner as in Example 13(b) except that 40 g of the resinous product, 180 g of tetrahydrofuran, 4 g (2.4 g in solids) of Raney nickel catalyst soaked in isopropyl alcohol and 12 ml of liquid ammonia were used, 37 g of cationic amino resin was obtained which had a softening point of 62.5° C, number average molecular weight of 410, weight average molecular weight of 917 and total amine value of 63.

Subsequently in the same manner as in Example 11(c) except that 10 g of the amino resin, 1.4 g of glacial acetic acid and 90 g of water were used, an aqueous solution was prepared which had a pH of 4.1 and was 10.4% in the concentration of nonvolatile substances.

Following the same procedure as in Example 12 except that 50 g of the aqueous solution and 3 g of epichlorohydrin were used, an aqueous solution was prepared which had a pH of 4.7 and was 11.7% in the concentration of nonvalatile substances.

EXAMPLE 23

In the same manner as in Example 13(a) except that 40 g of dicyclopentadiene, 32 g of acrylonitrile, 250 g of styrene and 322 g of cyclohexane were used to react them at 220° C for 2 hours and then at 260° C for 2 hours, 225 g of a resinous product was obtained which had a softening point of 92° C, number average molecular weight of 4,100 and weight average molecular weight of 101,000.

In the same manner as in Example 13(b) except that 50 g of the resinous product, 250 g of tetrahydrofuran and 5 g (3 g in solids) of Raney nickel catalyst soaked in isopropyl alcohol were used, 49 g of cationic amino resin was obtained which had a softening point of 89° C, number average molecular weight of 3,300 weight average molecular weight of 39,000 and total amine value of 80.

EXAMPLE 24

In the same manner as in Example 13(a) except that 78 g of the 1 molecule: 1 molecule addition product of cyclopentadiene and acrylonitrile obtained in Example 17(a), 173 g of dicyclopentadiene and 250 g of cyclohexane were used to react them at 220° C for 2 hours and then at 260° C for 2 hours, 200 g of a resinous product was obtained which had a softening point of 55° C, number average molecular weight of 310 and weight average molecular weight of 373.

In the same manner as in Example 13(b) except that 50 g of the resinous product, 180 g of tetrahydrofuran and 5 g (2.5 g in solids) of Raney catalyst soaked in isopropyl alcohol were used, 46 g of cationic amino resin was obtained which had a softening point of 65.5° C, number average molecular weight of 317, weight average molecular weight of 410 and total amine value of 100.

Subsequently 10 g of the amino resin was treated with 1.4 g of glacial acetic acid and 90 g of water at 90° C for 1 hour, whereby an aqueous solution was prepared which had a pH of 4.7 and was 10.3% in the concentration of nonvolatile substances.

EXAMPLE 25

In the same manner as in Example 1(a) except that 82 g of dicyclopentadiene, 65 g of dimethylaminoethyl methacrylate, 153 g of vinyl acetate and 300 g of xylene were used to conduct reaction at 220° C for 2 hours and then at 260° C for 4 hours, 288 g of cationic amino resin was obtained which had a softening point of 80° C, number average molecular weight of 820, weight average molecular weight of 1,630 and total amine value of 71.

EXAMPLE 26

In the same manner as in Example 1(a) except that 189 g of dicyclopentadiene, 61 g diallyl amine and 250 g of xylene were used to conduct reaction at 220° C for 2 hours and then at 260° C for 4 hours, 230 g of cationic amino resin was obtained which had a softening point of 92° C, number average molecular weight of 680, weight average molecular weight of 1,360 and total amine value of 134.

EXAMPLE 27

In the same manner as in Example 1(a) except that 160 g of dicyclopentadiene, 90 g of 3-dimethylamino-2-hydroxypropyl methacrylate and 250 g of xylene were used to conduct reaction at 220° C for 2 hours and then at 260° C for 4 hours, 238 g of cationic amino resin was obtained which had a softening point of 90° C, number average molecular weight of 780, weight average molecular weight of 1,590 and total amine value of 106.

EXAMPLE 28

In the same manner as in Example 1(a) except that 175 g of dicyclopentadiene, 75 g of dimethylaminoethyl acrylamide and 250 g of xylene were used to conduct reaction at 220° C for 2 hours and then at 260° C for 4 hours, 220 g of cationic amino resin was obtained which had a softening point of 86° C, number average molecular weight of 650, weight average molecular weight of 1,350 and total amine value of 112.

EXAMPLE 29

In the same manner as in Example 1(a) except that 195 of dicyclopentadiene, 55 g of N-vinyl imidazole and 250 g of xylene were used to conduct reaction at 220° C for 2 hours and then at 260° C for 4 hours, 243 g of cationic amino resin was obtained which had a softening point of 95° C, number average molecular weight of 850, weight average molecular weight of 1,750 and total amine value of 129.

Comparison Example 1

Hydrogenation reaction was conducted in the same manner as in Example 13(b) except that 50 g of

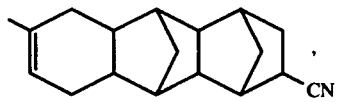

230 g of cyclohexane and 5 g (2.5 g in solids) of Raney nickel catalyst soaked in isopropylalcohol were used. To remove the unreacted substances and solvent, the reaction mixture was distilled at a reduced pressure of 15 mm Hg at the liquid temperature of up to 200° C, whereby 46 g of a liquid was obtained as a residue which had a total amine value of 223. The liquid exhibited a single sharp peak at 29.3 count by gel permeation chromatography and was an aminated product having a number average molecular weight of 332 and weight average molecular weight of 348.

Subsequently in the same manner as in Example 11(c) except that 20 g of the aminated product, 9.5 g of glacial acetic acid and 170 g of water were used, an aqueous solution was prepared which had a pH of 4.3 and was 11.5% in the concentration of nonvolatile substances.

Comparison Example 2

In the same manner as in Example 12 except that 100 g of the aqueous solution obtained in Comparison Example 1 and 12.6 g of epichlorohydrin were used, an aqueous solution was prepared which had a pH of 4.8 and was 13.0% in the concentration of nonvolatile substances.

Subsequently in the same manner as in Example 11(c) except that 10 g of the aminated product, 2 g of glacial acetic acid and 90 g of water were used, an aqueous solution was prepared which had a pH of 4.2 and was 9.8% in the concentration of nonvolatile substances.

Comparison Example 3

In the same manner as in Example 11(a) except that 264.6 g of dicyclopentadiene, 35.4 g of acrylonitrile and 450 g of cyclohexane were used to react them at 230° C for 4 hours, 120 g of a resinous product was obtained which had a softening point of 48° C, number average molecular weight of 220 and weight average molecular weight of 264. The resinous product exhibited a main peak at 31.7 count by gel permeation chromatography.

in the same manner as in Example 11(b) except that 40 g of the resinous product, 350 g of tetrahydrofuran and 4 g (2 g in solids) of Raney nickel catalyst soaked in isopropyl alcohol were used, amino resin was obtained which had a softening point of 50° C, number average molecular weight of 225, weight average molecular weight of 271 and total amine value of 89.

Subsequently in the same manner as in Example 11(c) except that 20 g of the amino resin, 3.8 g of glacial acetic acid and 180 g of water were used, an aqueous solution was prepared which had a pH of 4.5 and was 10.4% in the concentration of nonvolatile substances.

The resins and aqueous solution obtained in Examples and Comparison Examples were tested to determine their properties with the results given below.

Internal sizing effect

To 1% slurry of pulp (L-BKP) beaten to 30°SR was added, as a paper making sizing agent, a specified amount of the aqueous solution of resin prepared in each of Examples and Comparison Examples. Using a TAPPI Standard Sheet Machine, the resulting slurry adjusted to a pH of 7.0 and 20° C was made into paper weighing 60 g/m². The paper was dewatered under the condition of 3 kg/cm², thereafter dried at 110° C for 5 minutes and conditioned at 20° C and 65% RH for 24 hours. The sizing degree of the paper was determined according to JIS P-8122 (Stockight method). The results are shown in Table 1.

Table 1

| Sample | | Amount of Sample (Nonvolatiles/pulp) | |
|---|---|---|---|
| | | 1 % | 2 % |
| | | Sizing effect (sec.) | |
| Example | 1 | 21.0 | 45.9 |
| | 2 | 23.0 | 55.4 |
| | 3 | 20.1 | 38.5 |
| | 5 | 24.9 | 47.2 |
| | 6 | 26.1 | 49.9 |
| | 7 | 21.7 | 41.0 |
| | 8 | 22.9 | 42.5 |
| | 9 | 25.4 | 46.6 |
| | 11 | 24.4 | 34.8 |
| | 12 | 28.2 | 39.1 |
| | 13 | 22.4 | 40.4 |
| | 14 | 26.1 | 41.6 |
| | 15 | 23.5 | 40.9 |
| | 16 | 16.0 | 33.0 |
| | 17 | 20.8 | 38.9 |
| | 18 | 24.0 | 41.4 |
| | 19 | 16.7 | 49.3 |
| | 24 | 10.0 | 28.0 |
| Comparison Example | 1 | 3.0 | 5.0 |
| | 2 | 5.0 | 8.0 |
| | 3 | 3.0 | 8.0 |

Internal fixing effect, internal sizing effect and paper strengthening effect Paper was made in the same manner as in the determination of internal sizing effect as above except that specified amounts of aqueous solution of 5% carboxylated polyacrylamide and of the aqueous solution of resin in Example 12 were added to the pulp slurry, the polyacrylamide solution having viscosity of 10,000 cps at 25° C when the concentration was 10%. The sizing degree of the paper was determined according to JIS P-8122 (Stockight method) and burst factor thereof, according to JIS 8112. The results are given in Table 2.

Table 2

| | Ex. 12 | Ex. 12 | Ex. 12 | Blank |
|---|---|---|---|---|
| Amount of sample used (nonvolatiles/pulp) (%) | 1 | 2 | 0 | — |
| Amount of carboxylated polyacrylamide used (nonvolatiles/pulp) (%) | 0.5 | 0.5 | 0.5 | — |
| Sizing degree (sec.) | 30.3 | 42.4 | 0 | 0 |
| Burst factor | 1.89 | 2.10 | 1.45 | 1.43 |

Water repellency effect on rock wool board

To a slurry prepared by suspending rock wool uniformly in water were added, with stirring, an aqueous solution of starch in an amount of 6% (calculated as nonvolatiles based on rock wool) and aqueous solution of 5% carboxylated polyacrylamide (the viscosity of 10% aqueous solution of the same being 10,000 cps at 25° C) in an amount of 1% (same as above). To the slurry were further added a specified amount of the aqueous solution of resin obtained in Example 12 and 2.5% (same as above) of alum. The slurry was then uniformly mixed and thereafter made into a sheet on TAPPI Standard Sheet Machine, using a 16-mesh screen. The resulting product was cold-pressed at 2 kg/cm² and dried in hot air at 150° C for 3 hours. The rock wool sheet, having a thickness of 12.0 to 12.3 mm and specific gravity of 0.36 ± 0.01, was conditioned at 20° C and 70% RH for 24 hours and then tested to determine the bending strength thereof and the amount of water thereby absorbed according to JIS A-5905. The results are given in Table 3.

Table 3

|  | Amount of *¹ sample used (%) | Amount of water absorbed (g/cm³) | Bending strength (kg/cm²) |
|---|---|---|---|
| Example 12 | 0 | 0.6510 | 25.8 |
| " | 0.05 | 0.0821 | 27.3 |
| " | 0.1 | 0.0195 | 28.0 |
| " | 0.3 | 0.0135 | 30.1 |
| " | 0.5 | 0.0131 | 26.0 |
| Comparison *² Example 4 | 0.1 | 0.0362 | 21.9 |
| " | 0.5 | 0.0203 | 20.4 |

Note:
*¹Calculated as nonvolatile components based on rock wool.
*²Alkylketene dimer (Aquapel 360 XC, product of Hercules Powder Co., U.S.A.).

What we claim is:
1. A product of the process for producing a cationic amino resin characterized by subjecting to thermal polymerization for 30 minutes to 30 hours at a temperature of 170° to 300° C.
  1. an alicyclic conjugated polyene compound having an alicyclic ring of 5 to 7 carbon atoms, and
  2. an $\alpha,\beta$-ethylenically unsaturated nitrile of the formula

$$\begin{array}{c} R^8 \ \ R^9 \\ | \ \ \ | \\ NC-C=C-A \end{array}$$

wherein $R^8$ and $R^9$ are each hydrogen or methyl, and A is H or CN, to prepare a copolymer containing a nitrile group, there being 0.5 to 20 moles of said polyene compound per mole of said unsaturated nitrile, and hydrogenating said copolymer to reduce said nitrile group, said resin having a weight average molecular weight of 400 to 10,000 and an amine value of 20 to 700.

2. A product according to claim 1 wherein said temperature is 210° to 280° C and there are 3 to 12 mols of said polyene compound per mole of said unsaturated nitrile.
3. A product according to claim 1 wherein said resin is reacted with 0.5 to 10 mols of alkylating agent per mole of said resin at a temperature of 30° to 100° C for 10 minutes to 10 hours, said alkylating agent taken from the class consisting of
  1. halogen-containing compounds of the formula $$R^{10}B$$

wherein $R^{10}$ is lower alkyl, benzyl or phenoxyethyl and B is halogen,
  2. dialkyl sulfites and dialkyl sulfates of the formula $$(R^{11}O)_2SO_V$$

wherein $R^{11}$ is lower alkyl and V is 1 or 2, and
  3. ethylene oxide derivatives of the formula $$R^{12}-CH-CH_2 \\ \ \ \ \ \ \ \ \ \ \ \ \ \backslash \ \ /\ \\ \ \ \ \ \ \ \ \ \ \ \ \ \ \ O$$

wherein $R^{12}$ is hydrogen, lower alkyl or phenyl, and mixtures of said alkylating agents.

4. A product according to claim 3 wherein said halogen containing compounds are taken from the class consisting of methyl chloride, ethyl chloride, propyl chloride, benzyl chloride, phenoxyethyl chloride and bromides and iodides corresponding to said chlorides; said sulfites and sulfates are taken from the class consisting of dimethyl sulfate, diethyl sulfate, dimethyl sulfite, and diethyl sulfite; said ethylene oxide derivatives are taken from the class consisting of ethylene oxide, propylene oxide, butylene oxide, and styrene oxide.

5. A product according to claim 1 wherein said resin is further reacted with epihalohydrin.
6. A product according to claim 5 wherein said epihalohydrin is of the formula $$CH_2-CH(CH_2)_wD \\ \ \ \ \ \ \backslash \ \ /\ \\ \ \ \ \ \ \ \ O$$

wherein $w$ is 1, 2, or 3 and D is halogen.

7. A product according to claim 6 wherein said epihalohydrin is epichlorohydrin.
8. A product according to claim 1 wherein said polyene compound is dicyclopentadiene, and said unsaturated nitrile is acrylonitrile.
9. A product according to claim 3 wherein acetic acid is used as a neutralizer.
10. The process according to claim 1 wherein said polyene compound is dicyclopentadiene, and said unsaturated nitrile is acrylonitrile.
11. The process according to claim 5 wherein said epihalohydrin is epichlorohydrin.

* * * * *